United States Patent [19]

Kuriyaki et al.

[11] Patent Number: 5,697,044
[45] Date of Patent: Dec. 9, 1997

[54] PROCESS FOR SINTERING $YBA_2CU_3O_x$ THROUGH WET GRAIN-COATING

[75] Inventors: Hisao Kuriyaki; Kazuyoshi Hirakawa, both of Fukuoka; Xuguang Zheng, Tosu, all of Japan

[73] Assignee: Kyushu University, Fukuoka Pref., Japan

[21] Appl. No.: 685,402

[22] Filed: Jul. 24, 1996

[30] Foreign Application Priority Data

Nov. 14, 1995 [JP] Japan .................... 7-295175

[51] Int. Cl.[6] .................................................. B22F 1/00
[52] U.S. Cl. .................... 419/35; 419/38; 505/470; 505/826; 505/490; 505/739
[58] Field of Search .................. 419/35, 38; 505/470, 505/490, 739, 826

[56] References Cited

U.S. PATENT DOCUMENTS

| | | |
|---|---|---|
| 4,914,081 | 4/1990 | Miller et al. ................... 505/1 |
| 4,997,808 | 3/1991 | Chatterjee et al. ............ 505/1 |
| 5,002,927 | 3/1991 | Chevallier et al. ............ 505/1 |
| 5,061,682 | 10/1991 | Aksay et al. .................. 505/1 |
| 5,106,825 | 4/1992 | Mandigo et al. ............... 505/1 |
| 5,141,918 | 8/1992 | Hirano ........................... 505/1 |
| 5,153,172 | 10/1992 | Chen et al. .................... 505/1 |
| 5,202,306 | 4/1993 | Goretta et al. ................. 505/1 |
| 5,284,823 | 2/1994 | Chou et al. ..................... 505/1 |
| 5,409,887 | 4/1995 | Balachandran ............. 505/490 |
| 5,482,918 | 1/1996 | Maginnis et al. ............ 505/440 |

*Primary Examiner*—Charles T. Jordan
*Assistant Examiner*—Daniel Jenkins
*Attorney, Agent, or Firm*—Brumbaugh, Graves, Donohue & Raymond

[57] ABSTRACT

A high-temperature $YBa_2Cu_3O_x$ superconducting sintered body is produced through wet grain-coating process in which starting grains are soaked in $SnI_4$ solution, pressed after the removal of solvent and then sintered at a given temperature, and has a critical current density of at least 500 $A/cm^2$ at 77 K.

2 Claims, 4 Drawing Sheets

FIG_2a
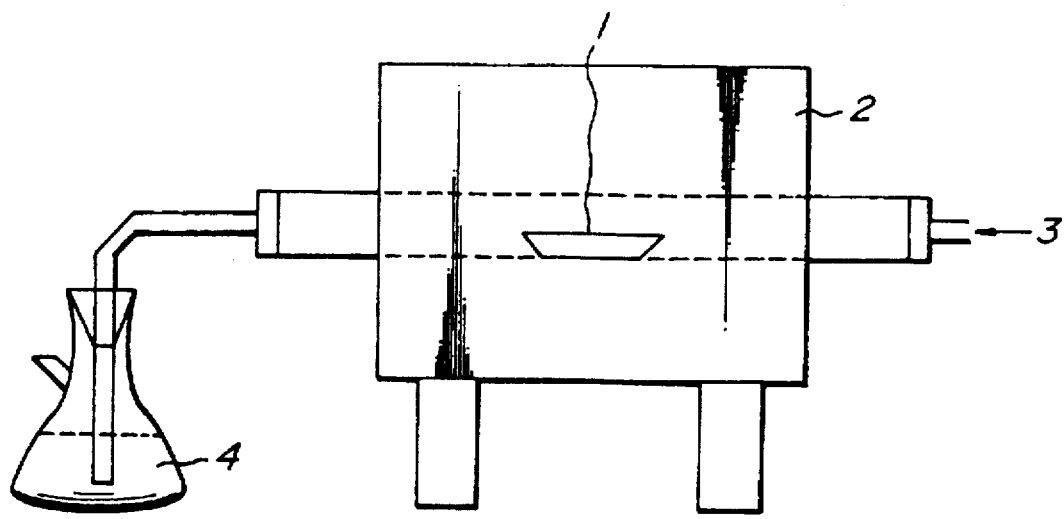
FIG_2b
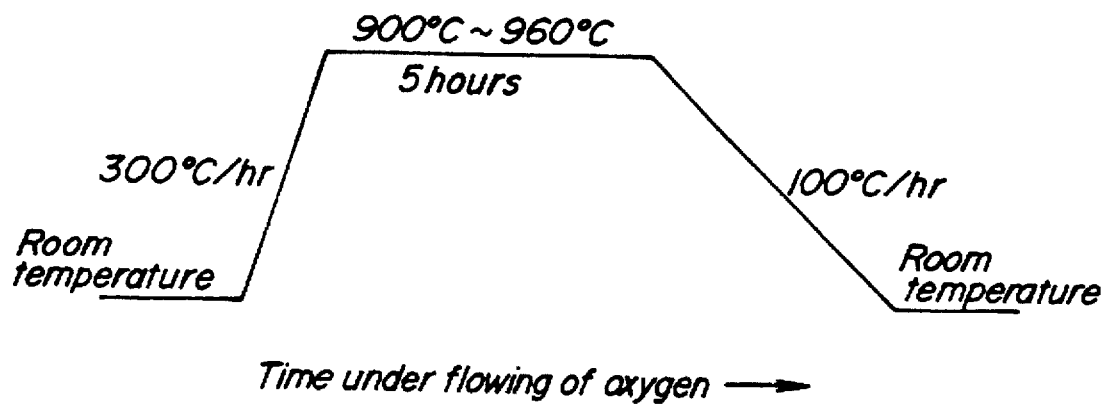

PROCESS FOR SINTERING $YBA_2CU_3O_x$ THROUGH WET GRAIN-COATING

BACKGROUND OF THE INVENTION

1. Field of the Invention

This invention relates to a process for sintering a high-temperature superconducting oxide bulk material having a high critical current density.

2. Description of Related Art

The critical current density of the high-temperature superconducting oxide bulk material is restricted to a low level due to low orientation of crystal grains and weak inter-grain links in the bulk material, which becomes an obstruction for large-current applications such as superconducting magnets and the like. In order to improve the critical current density of Y-based high-temperature superconductors, there have been attempted impurity-doping process and zone melting process. In the former process, the critical current density of bulk material is improved by incorporating a great amount (not less than 10%) of a noble metal such as silver or the like into the Y-based high-temperature superconductor to promote the sintering in heat treatment. In the latter process, a high-orientation Y-based high-temperature superconductors are prepared by using a heat treatment of a very high temperature (1100°–1400° C.) and a directional temperature gradient to promote crystal growth in a specified direction.

In the doping process, however, the degree of improving the critical current density is very slight though a great amount of noble metal is used. In the melting process, the high-temperature treatment is necessary, so that it is required to use an expensive and specific vessel such as platinum crucible or the like and a high temperature-controlling technique in the preparation of high-temperature superconductors. Besides, it can not be used in a metal-sheathed wire.

For this end, it is strongly demanded to improve the weak inter-grain link and low orientation of the high-temperature superconductor to prepare a high-temperature superconducting bulk material having a higher critical current density by a simple process. Besides the melting process of $YBa_2Cu_3O_x$ sample, there is not yet developed a process for the production of high-temperature superconducting bulk material having a high critical current density durable to practical use. Moreover, such a melting process itself is complicated, and there is a limit to its mass production.

SUMMARY OF THE INVENTION

It is, therefore, an object of the invention to provide a process for sintering $YBa_2Cu_3O_x$ through wet grain-coating for relatively simply producing high-temperature superconducting oxide bulk materials having a high critical current density.

According to the invention, there is the provision of a process for sintering $YBa_2Cu_3O_x$ through wet grain-coating, which comprises soaking $YBa_2Cu_3O_x$ grains as a high-temperature superconducting oxide substance in a solution consisting of $SnI_4$ as a solute and a solvent, evaporating the solvent from the solution to uniformly form a thin film of $SnI_4$ on a surface of $YBa_2Cu_3O_x$ grain, uniaxially or hydrostatically pressing the thus treated grains and then sintering them at a temperature of 900°–1100° C. in an oxygen atmosphere to prepare a high-temperature superconductor having a critical current density of at least 500 A/cm² at a temperature of 77 K, an improved inter-grain link and a good orientation.

According to the invention, the surfaces of $YBa_2Cu_3O_x$ grains to be sintered as the high-temperature superconducting oxide substance are coated with the $SnI_4$ thin films, which are pressed and then subjected to the heat treatment for the sintering, so that the inter-grain links, particularly orientation in the high-temperature superconductor is considerably improved by the action of $SnI_4$ during the heat treatment, whereby the critical current density is remarkably improved.

BRIEF DESCRIPTION OF THE DRAWINGS

FIG. 2a is a diagrammatical view of a device for carrying out the sintering according to the invention;

FIG. 2b is a view showing a relation between temperature and time in the sintering according to the invention;

DESCRIPTION OF THE PREFERRED EMBODIMENTS

Figure 1:
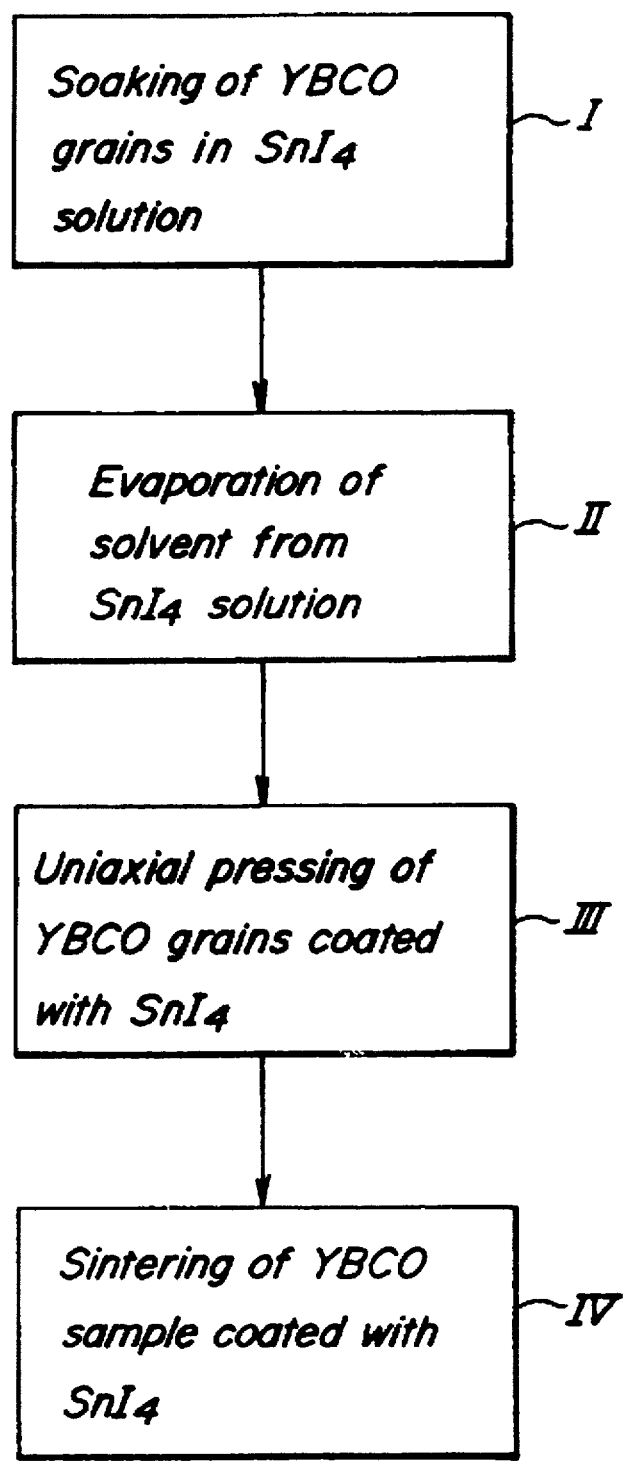
FIG. 1 is a flow chart illustrating steps for carrying out the sintering process according to the invention.

The high-temperature superconducting substance represented by a chemical formula of $YBa_2Cu_3O_x$ used in the invention is an oxide wherein x in the chemical formula is within a range of 6.5–7.0, which is commonly abbreviated as YBCO in this field.

In the invention, the surfaces of crystal grains of YBCO are coated with the thin films of $SnI_4$, which are pressed and then sintered. The inter-grain link of the high-temperature superconductor, particularly orientation degree thereof is considerably improved by the action of $SnI_4$ during the heat treatment for the sintering, which is also confirmed by scanning electron microscopy and X-ray diffractometry.

According to the scanning electron microscopy, there is little difference in the state of crystal between the grain sample having a less Sn coating quantity and the grain sample having no Sn coating quantity. On the contrary, the crystal grain growth is controlled in the grain sample having a large Sn coating quantity because iodine is completely evaporated to leave only Sn between the grains during the sintering according to the invention or Sn is inserted between the superconductor grains to increase the inter-grain contact in the sintering. Therefore, it is considered that the improvement of critical current density $J_c$ as mentioned below is not dependent on the grain growth.

On the other hand, the c-axis orientation degree of YBCO is measured from the X-ray diffraction data. As a result, the c-axis orientation degree is improved by the above Sn coating treatment and the improvement of $J_c$ is obtained in proportion thereto.

When YBCO superconductor is subjected to wet grain-coating of Sn according to the invention, there are obtained the following interested results:

1̂ $J_c$ is considerably improved;
2̂ Superconducting transition temperature is unchangeable;
3̂ Change of resistivity at room temperature corresponds to change of $J_c$;
4̂ Growth of YBCO grains is controlled during the sintering; and
5̂ Improvement of c-axis orientation degree in YBCO has the same tendency as that of $J_c$.

Particularly, the decrease of resistivity at room temperature and the improvement of c-axis orientation degree serve to improve $J_c$ through the coating. In the superconducting oxide ceramics, the contact area between sintered grains is small due to the low density. On the other hand, when the surfaces of the grains are covered with Sn thin films through wet grain-coating according to the invention, the contact area between the grains is increased by any action of Sn film during the sintering to promote the sintering reaction, whereby the packing density of the grains is increased to increase macroscopical channels of current flowing across the grains and hence the resistivity lowers to improve $J_c$.

Moreover, there is frequently caused the deviation of the composition on the grain surface of the superconductor from the stoichiometry to bring about the ununiformity at the grain boundary, which badly affects the transport current flowing through the whole of the superconductor. According to the invention, the composition at the grain boundary can be uniformized by the Sn thin film formed through wet grain-coating to improve $J_c$.

The dependency of $J_c$ to the coating thickness of the film is examined by calculating the coating thickness from the coating quantity according to the following equation:

$$t=118.7/\{(118.7+(126.9\times 4)\}\times (M/\rho S)$$

wherein t is a coating thickness of Sn layer, M is a total coating quantity of $SnI_4$, S is a surface area of YBCO grain coated, ρ is a density of Sn, an atomic weight of Sn is 118.7 and an atomic weight of I is 126.9. Although the coating thickness is actually influenced by the shape of crystal grain and the like, the value obtained from the above equation can be considered to be an accuracy estimating an order of $J_c$. That is, when the Sn coating thickness is within a range of 1–3 nm, the effect of improving $J_c$ becomes largest. Such a range of the coating thickness just corresponds to a coherence length of YBCO oxide superconductor, which is considered to be a proof that the Sn coating layer reacts with portion at grain boundary to improve the superconducting property of the grain boundary.

Furthermore, the YBCO superconductor has a lamellar texture, an orientation of which as a whole of grain largely exerts upon $J_c$. In the crystal grain growth, the YBCO grains naturally tend to grow at a–b faces, but free growth can not be attained without coating. According to the invention, the Sn layer coated on the surfaces of the grains serves as a flux and improves the crystal growth in the sintering to promote the orientation thereof. The improvement of orientation degree is confirmed in results by the X-ray diffractometry, which is considered to be a mechanism for improving $J_c$.

The following examples are given in illustration of the invention and are not intended as limitations thereof.

At first, various samples are prepared by starting from a commercially available YBCO grain (average grain size: 2 μm, made by Dowa Mining Co., Ltd.) according to the sintering process of the invention. As shown in FIG. 1, the sintering process according to the invention consists of step I, step II, step III and step IV. In the step I, the YBCO grains are soaked in an $SnI_4$ solution obtained by weighing $SnI_4$ (purity: 99%, made by Mitsuwa Chemical Co., Ltd.) so as to have a weight ratio of $SnI_4$:YBCO=0–1:12 and completely dissolving into acetone (purity: 99.5%, made by Hayashi Pure Chemical Co., Ltd.) as a solvent. In the step II, acetone is evaporated at room temperature while applying ultrasonic vibrations to the solution after the soaking, whereby $SnI_4$ is coated onto the surfaces of the YBCO grains (at a thickness of few nanometers). In the step III, the YBCO grains coated with $SnI_4$ are uniaxially pressed under a pressure of, for example, 5 ton/cm² into samples such as rectangular bars of $20\times 2\times 0.3mm^3$ or pellets of 20mm in diameter and 6mm in thickness. In the step IV, the sample is sintered in a device shown in FIG. 2a according to a time schedule for the sintering as shown in FIG. 2b.

In FIG. 2a, numeral 1 is an alumina boat, numeral 2 an electric furnace (SFSH-18 siliconit, made by Takanetsu Kogyo Co., Ltd.), numeral 3 a flow of oxygen (e.g. about 100 cm³/min), and numeral 4 a water trap.

In Example 1, the bar sample obtained in the step III is placed on the alumina boat 1 and then placed in the electric furnace 2, at where the bar sample is sintered at a temperature of 900° C., 940° C. or 960° C. under the flowing of oxygen for 5 hours according to the time schedule shown in FIG. 2b in which a temperature rising rate from room temperature to the given sintering temperature is 300° C./h and a cooling rate from the given sintering temperature to room temperature is 100° C./h.

Figure 3:
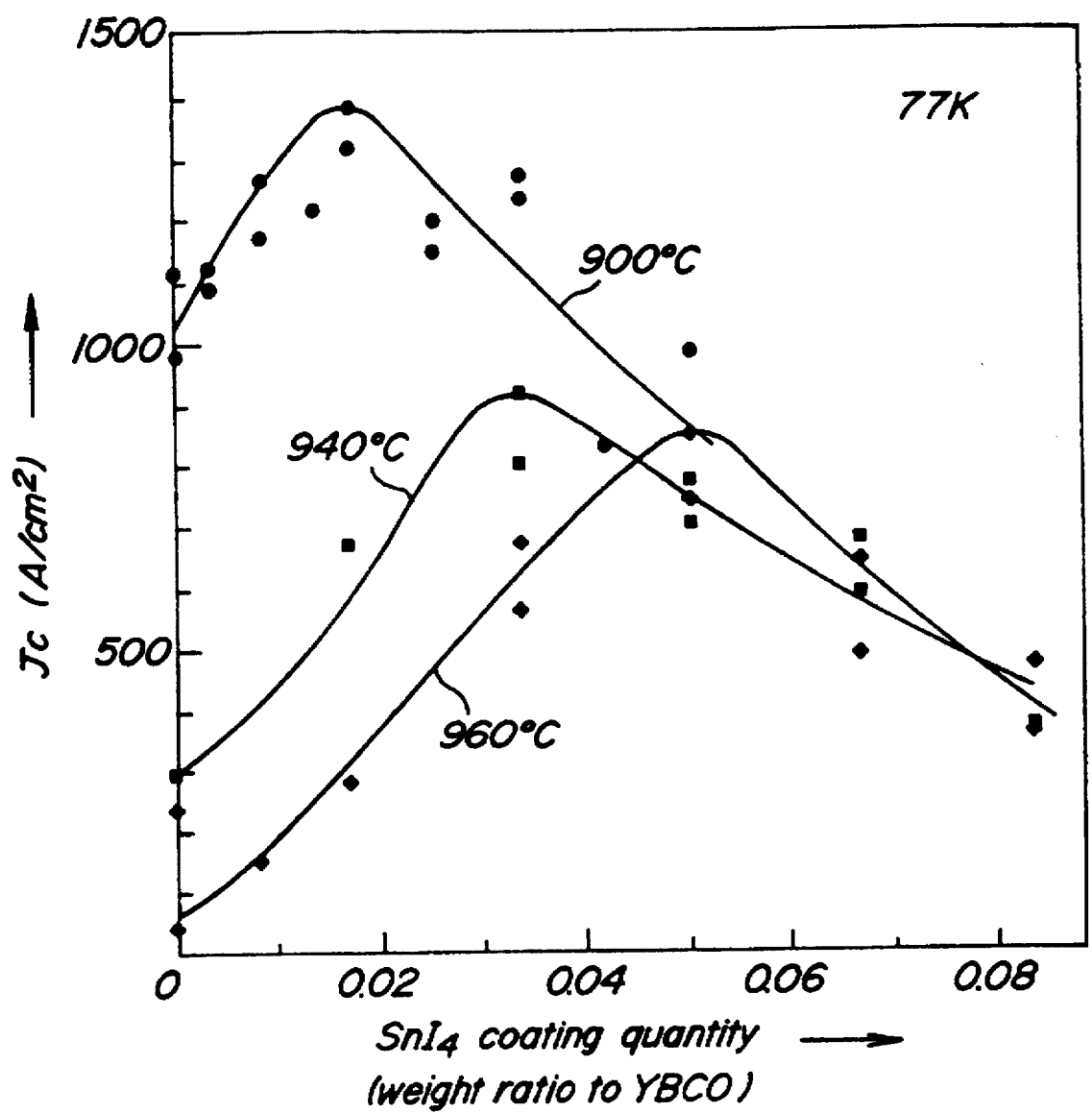
FIG. 3 is a graph showing a change of critical current density to Sn coating quantity in a bar sample in Example 1 according to the invention.

FIG. 3 shows an effect of improving the critical current density Jc of YBCO sintered body by $SnI_4$ coating treatment through the sintering process according to the invention. The critical current density is measured by flowing a direct current through each of the resulting YBCO sintered samples in zero field at 77 K. In FIG. 3, an abscissa is a weight ratio of $SnI_4$ coating quantity to YBCO, and an ordinate is a critical current density (A/cm²). As seen from FIG. 3, the critical current densities of the YBCO bodies sintered at temperatures of 900° C., 940° C. and 960° C. are improved by about 1.5 times, 3 times and 6.2 times as compared with those of YBCO sintered bodies not subjected to the $SnI_4$ coating treatment. Moreover, the weight ratio of $SnI_4$ coating quantity is based on the calculation from the originally weighed quality of $SnI_4$, but it has been confirmed as a matter of fact that iodine is completely evaporated in the sintering.

Figure 4:
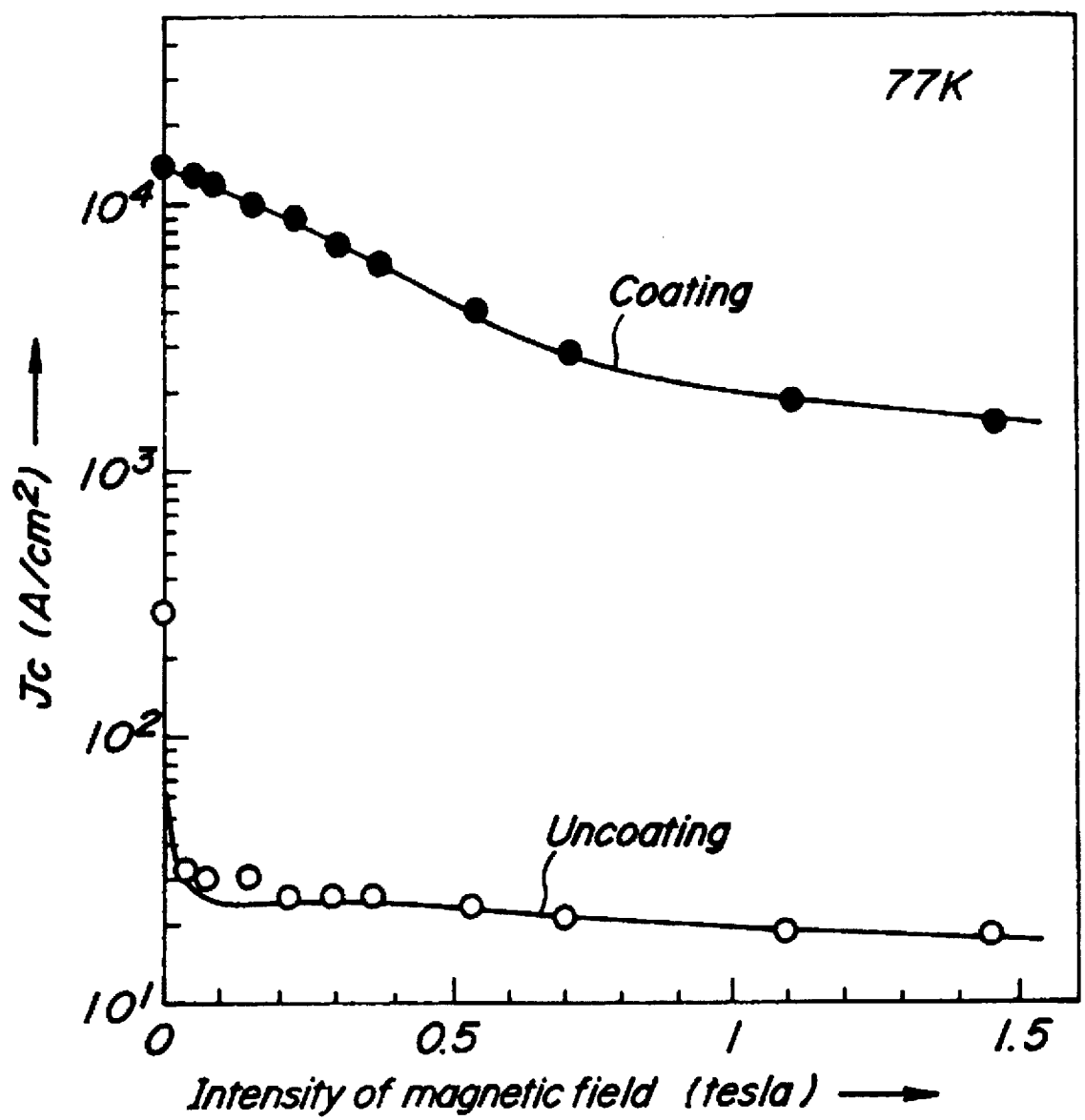
FIG. 4 is a graph showing a comparison between Example 2 according to the invention and a comparative embodiment in the critical current density.

In Example 2, the pellet sample obtained in the step III is sintered according to the time schedule shown in FIG. 2b except that the sample is sintered within a temperature range of 1000° C.–1100° C. for 10 minutes. FIG. 4 shows a relation between an intensity of magnetic field (tesla) and a critical current density (A/cm²) in the YBCO superconducting pellet subjected to $SnI_4$ coating according to the invention as compared with the YBCO superconducting pellet subjected to the sintering without $SnI_4$ coating. As seen from FIG. 4, the critical current density of the sintered body according to the invention is improved by about 100 times as compared with that of the sintered body not coated with $SnI_4$.

As mentioned above, according to the invention, the crystal grain growth of YBCO as a high-temperature superconducting oxide bulk material is controlled by $SnI_4$ coating through wet grain-coating process to improve the inter-grain links and the orientation of crystal, whereby the critical current density is largely increased as compared with that not subjected to $SnI_4$ coating.

What is claimed is:

1. A process for sintering $YBa_2Cu_3O_x$ through wet grain-coating, which comprises soaking $YBa_2Cu_3O_x$ grains as a high-temperature superconducting oxide substance in a solution consisting of $SnI_4$ as a solute and a solvent, evaporating the solvent from the solution to uniformly form a thin film of $SnI_4$ on a surface of $YBa_2Cu_3O_x$ grain, pressing the thus treated grains and then sintering them at a temperature of 900°–1100° C. in an oxygen atmosphere to prepare a high-temperature superconductor having a critical current density of at least 500 A/cm² at a temperature of 77 K, an improved inter-grain link and a good orientation.

2. A process according to claim 1, wherein said solvent is acetone.

* * * * *